(12) United States Patent
Rotem et al.

(10) Patent No.: US 8,386,807 B2
(45) Date of Patent: Feb. 26, 2013

(54) POWER MANAGEMENT FOR PROCESSING UNIT

(75) Inventors: Efraim Rotem, Haifa (IL); Dan Baum, Haifa (IL); Rajwan Doron, Rishon Le-Zion (IL); Omer Vikinski, Haifa (IL); Ronny Korner, Haifa (IL); Kosta Luria, Pardesiya (IL)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 12/242,000

(22) Filed: Sep. 30, 2008

(65) Prior Publication Data

US 2010/0083009 A1   Apr. 1, 2010

(51) Int. Cl.
*G06F 1/00* (2006.01)

(52) U.S. Cl. ........................................................ 713/300

(58) Field of Classification Search .................. 713/300, 713/320, 323, 324
See application file for complete search history.

(56) References Cited

U.S. PATENT DOCUMENTS

| | | | |
|---|---|---|---|
| 6,594,029 B1 | 7/2003 | Mellor et al. | |
| 7,080,268 B2 * | 7/2006 | Mosley | 713/320 |
| 7,093,140 B2 * | 8/2006 | Hsu et al. | 713/300 |
| 7,363,523 B2 | 4/2008 | Kurts et al. | |
| 7,392,416 B2 * | 6/2008 | Watts, Jr. et al. | 713/323 |
| 7,401,241 B2 | 7/2008 | Rotem et al. | |
| 7,434,171 B2 * | 10/2008 | Clapper | 715/771 |
| 7,502,948 B2 | 3/2009 | Rotem et al. | |
| 7,565,513 B2 * | 7/2009 | Ahmed et al. | 712/222 |
| 2003/0056126 A1 * | 3/2003 | O'Connor et al. | 713/300 |
| 2003/0126478 A1 * | 7/2003 | Burns et al. | 713/300 |
| 2003/0131269 A1 * | 7/2003 | Mizyuabu et al. | 713/320 |
| 2004/0128100 A1 | 7/2004 | Rotem | |
| 2004/0128663 A1 | 7/2004 | Rotem | |
| 2005/0046400 A1 | 3/2005 | Rotem | |
| 2005/0077883 A1 * | 4/2005 | Walters | 323/273 |
| 2005/0283625 A1 | 12/2005 | Rotem et al. | |
| 2006/0026447 A1 | 2/2006 | Naveh et al. | |
| 2006/0034343 A1 | 2/2006 | Rotem | |
| 2006/0047986 A1 | 3/2006 | Kurts et al. | |
| 2006/0090086 A1 | 4/2006 | Rotem et al. | |
| 2006/0095798 A1 | 5/2006 | Finkelstein et al. | |
| 2006/0136076 A1 | 6/2006 | Rotem et al. | |
| 2006/0143485 A1 | 6/2006 | Naveh et al. | |
| 2006/0143486 A1 | 6/2006 | Lamdan et al. | |

(Continued)

OTHER PUBLICATIONS

Office Action issued Aug. 15, 2011 in Chinese Patent Application No. 200910211682.X, 11 pages.

(Continued)

*Primary Examiner* — Thomas Lee
*Assistant Examiner* — Scott Snyder
(74) *Attorney, Agent, or Firm* — Schwabe, Williamson & Wyatt, P.C.

(57) ABSTRACT

Methods, apparatuses, and systems for managing power of a processing unit are described herein. Some embodiments include determining a voltage variation of a subset of current components of a current consumed by a processing unit. Other embodiments include detecting architectural events on a processing core of the processing unit and instituting various actions to reduce an input rate of instructions to the core. Other embodiments may be described and claimed.

12 Claims, 9 Drawing Sheets

U.S. PATENT DOCUMENTS

| | | |
|---|---|---|
| 2006/0149974 A1 | 7/2006 | Rotem et al. |
| 2006/0149975 A1 | 7/2006 | Rotem et al. |
| 2006/0254296 A1 | 11/2006 | Finkelstein et al. |
| 2007/0005152 A1 | 1/2007 | Karr et al. |
| 2007/0257650 A1* | 11/2007 | Southwell et al. ............ 323/283 |
| 2008/0148027 A1 | 6/2008 | Fenger et al. |
| 2008/0148070 A1 | 6/2008 | Dettinger et al. |
| 2008/0155281 A1 | 6/2008 | Savransky et al. |
| 2009/0083551 A1 | 3/2009 | Finkelstein et al. |
| 2009/0319812 A1* | 12/2009 | Laughlin ....................... 713/322 |

OTHER PUBLICATIONS

Office Action issued Feb. 22, 2012 in Chinese Patent Application No. 200910211682.X, 10 pages.

Office Action issued Sep. 13, 2012 in Chinese Patent Application No. 200910211682.X, 9 pages.

* cited by examiner

POWER MANAGEMENT FOR PROCESSING UNIT

FIELD

Embodiments of the disclosure relate generally to electronic components and, more specifically, to managing power for a processing unit.

BACKGROUND

Today's central processing units (CPUs) have significant variability in their dynamic current consumption as a function of the application workload. Their potential current consumption is very high, while their typical current consumption is much lower. In order to provide sufficient voltage to the CPU throughout the entire range of current consumption a power delivery system typically provides a voltage with a significant voltage guard band. That is, the power delivery system provides the CPU with extra voltage to handle sudden changes in current consumption, which affect a corresponding voltage drop. While providing a large voltage guard band ensures adequate processing functionality from the CPU, it also results in higher costs, greater power consumption, and shorter product lifetime of CPUs.

BRIEF DESCRIPTION OF THE DRAWINGS

Embodiments of the disclosure will be described referencing the accompanying drawings, in which like references denote similar elements.

DETAILED DESCRIPTION

Illustrative embodiments include but are not limited to processes, apparatuses, and systems that reduce voltage guard bands admitted to processing units of computing devices.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

Figure 1:
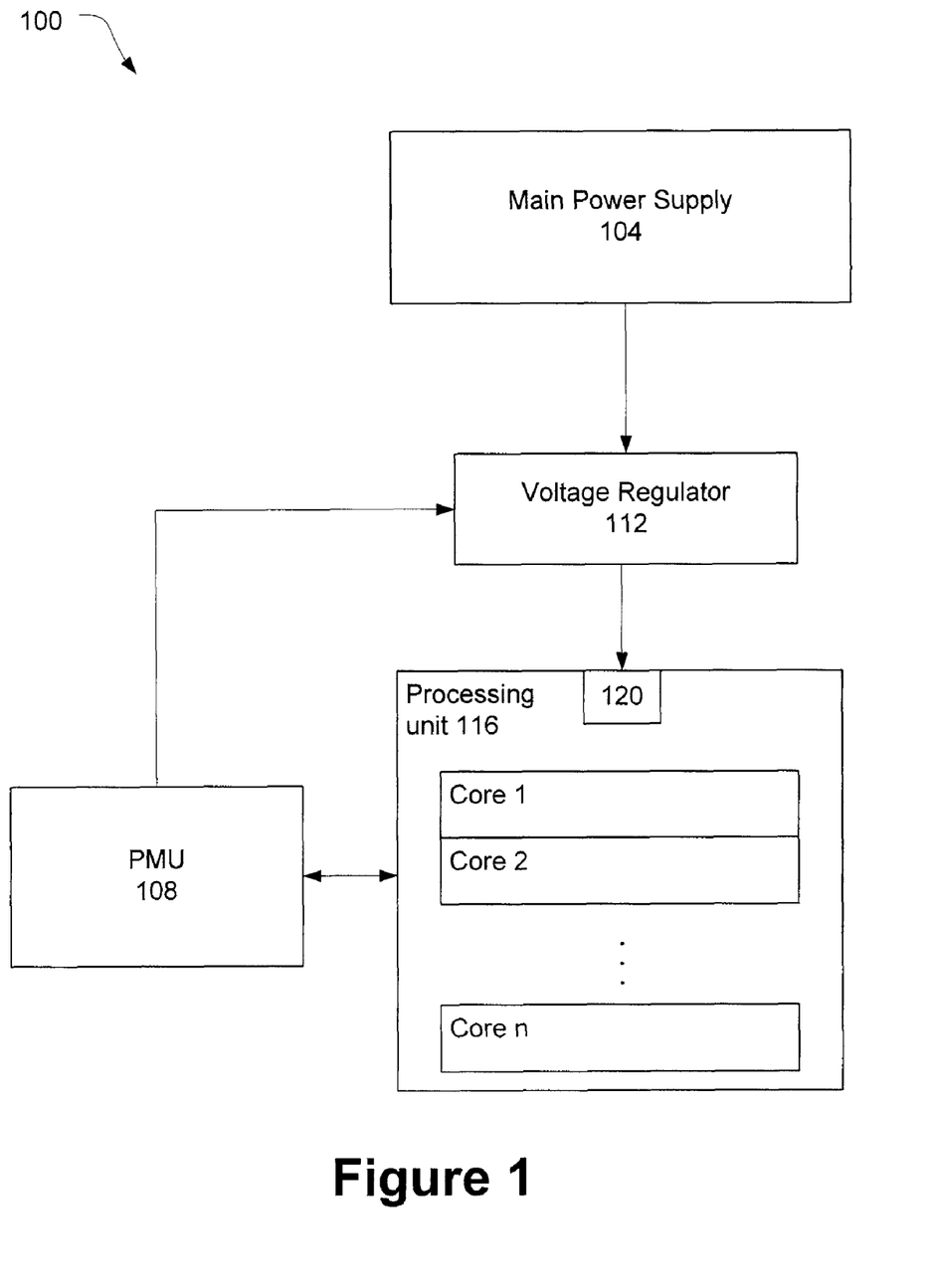
FIG. 1 illustrates a processing and power management system in accordance with various embodiments.

FIG. 1 illustrates a processing and power management system (hereinafter "system") 100 in accordance with various embodiments. The system 100 includes a main power supply 104, a power management unit (PMU) 108, a voltage regulator 112, and a processing unit 116 coupled to each other as shown. The voltage regulator 112 may be coupled to the processing unit 116 through an input/output interface 120 that provides a power and/or signaling interface.

The PMU 108 may be coupled to, or integrated within, the processing unit 116, and may collect information from the processing unit 116 and control the voltage regulator 112 to provide a desired voltage, as will be discussed in further detail herein.

The processing unit 116 is shown with multiple cores, e.g., n cores; however, in other embodiments, the processing unit 116 may have one or two cores.

The main power supply 104 may be a power source used to power all of the modules of a computing device in which the system 100 is implemented. For example, the main power supply 104 may power a display, a mass storage device, auxiliary processing units, etc. The main power supply 104 may be a battery, an alternating current (AC) to direct current (DC) power converter, etc.

The main power supply 104 may output a voltage that is much larger than an input voltage desired by the processing unit 116. Accordingly, the PMU 108 may control the voltage regulator 112 to step down and regulate the voltage prior to admitting it to the processing unit 116.

A desired voltage will be one that is sufficient to sustain the desired frequency of the processing unit 116 in order to avoid processing errors. A desired voltage will also be one that is no too high, which could result in wasted power and/or a shorter product lifetime. The power is a square function of voltage and, therefore, any power penalty may be high.

Changes in current consumption at the processing unit 116 may result in the voltage varying over time. Accordingly, the voltage set by the PMU 108 may, in certain instances, include a voltage guard band that provides the processing unit 116 with sufficient power to sustain a desired frequency. Embodiments of this disclosure reduce the size of the voltage guard band, which may include elimination of the voltage guard band altogether in certain situations, used to accommodate the consumed current while maintaining desired performance. As will be described, some embodiments provide for this reduction through a more precise accounting of the voltage variation provided by the consumed current. Other embodiments provide for this reduction through control of the peak current demands through detection of architectural events.

Figure 2:
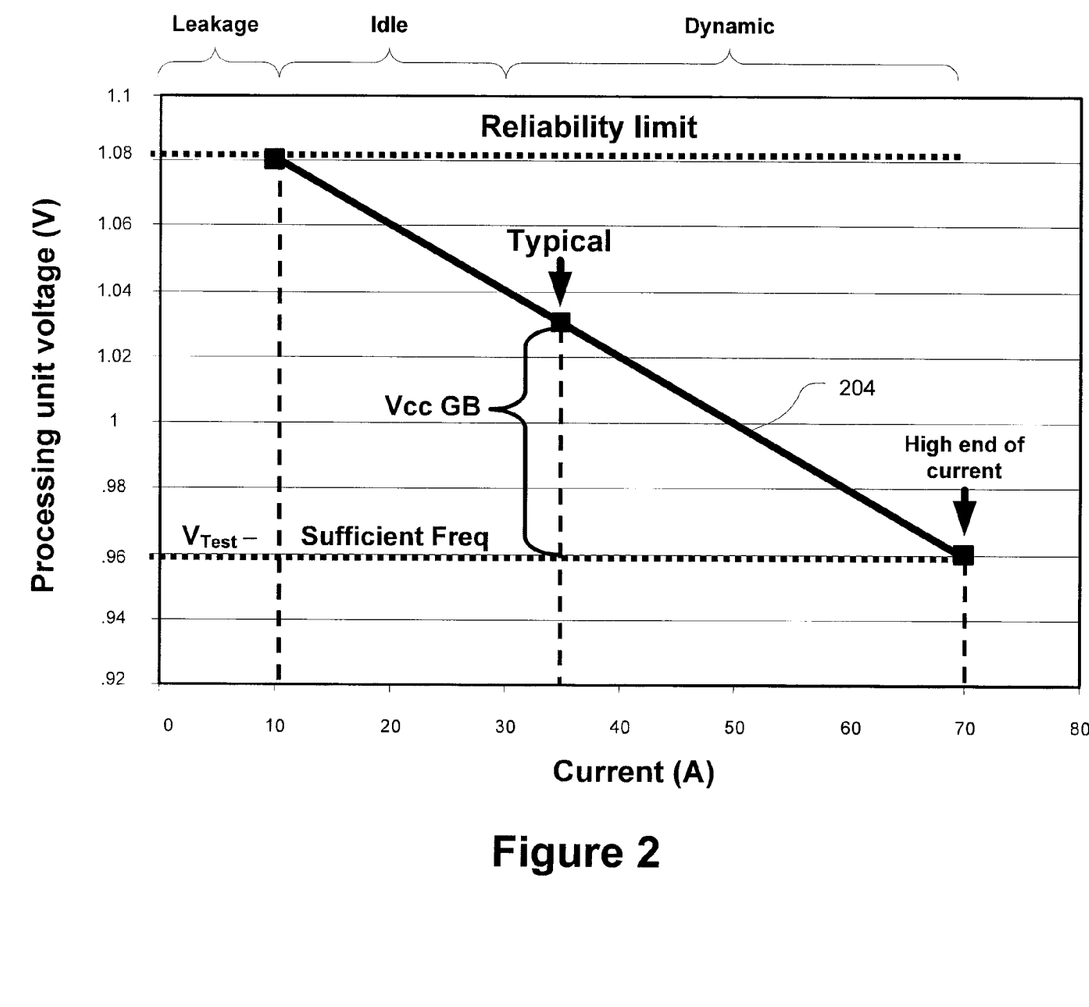
FIG. 2 illustrates a load line as a function of a voltage of a processing unit and current in accordance with various embodiments.
Figure 3:
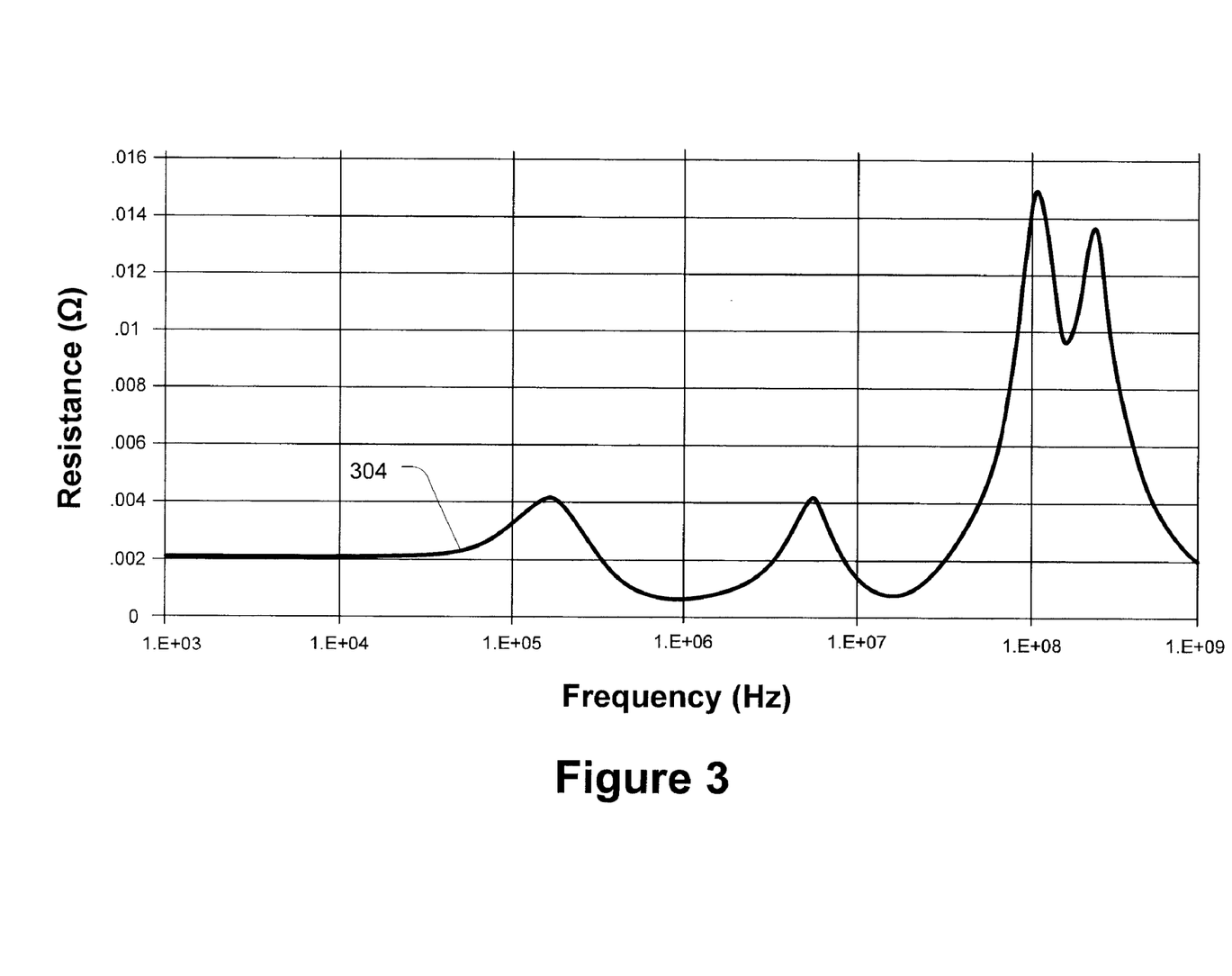
FIG. 3 illustrates a load line as a function of impedance and frequency in accordance with various embodiments.

Providing a more precise accounting of the voltage variation may be done by recognizing that a current consumed by the processing unit 116 is comprised of a plurality of different current components with each component impacting the overall voltage variation to a different degree. Prior art designs that do not account for such variation use a maximum impact over the range of the current, thereby introducing unnecessary voltage guard band headroom. FIGS. 2 and 3 provide graphs to facilitate this explanation.

FIG. 2 illustrates a load line 204 as a function of a voltage V_pu of the processing unit 116 and current I in accordance with various embodiments. The current I may include a 10 amp (A) leakage current component, a 20 A idle current component (e.g., from 10 A to 30 A), and a 40 A dynamic current component (e.g., from 30 A to 70 A). The determination that these current components correspond to these ranges, which are presented merely as an example, will be discussed in further detail below.

The voltage V_vid set by the voltage regulator 112 may account for the voltage drop as the current increases. The V_vid may be set by the PMU 108 providing the voltage regulator 112 with a digital value, e.g., a voltage identification (VID) value, that corresponds to the voltage V_vid.

The voltage drop may be determined by the resistance R_ll of the load line times the current I. These values may be related to the V_pu by:

$$V\_pu = V\_vid - I * R\_ll. \qquad \text{Equation 1}$$

To account for the voltage drop over the entire range of current I, a V_vid may be set at, e.g., 1.1 volts (V) (the y-intercept of the load line 204). This may ensure that even at the high-end of the current I, e.g., 70 A, the corresponding V_pu will be no less than a test voltage V_test, e.g., 0.96 V, which is enough to provide a frequency sufficient for reliable processing.

Setting V_vid at 1.1 V and relying upon this load line behavior for the entire range of current from 0 A to 70 A may be sufficient to maintain desired frequency levels; however, it may be overly conservative. This may be evident through an examination of the characteristics of the various current components.

FIG. 3 illustrates a load line 304 as a function of impedance and frequency in accordance with various embodiments. As can be seen, impedance remains virtually unchanged until a frequency of approximately 50 kilohertz (kHz). From about 50 kHz-10 megahertz (MHz) the impedance fluctuates about 3 milliohms (mΩ), and spikes to approximately 15 mΩ around 100 MHz.

The idle and leakage current components may have DC characteristics and, therefore, a very low frequency. Accordingly, as can be seen in FIG. 3, the impedance experienced at low frequencies may be steady. Thus, the PMU 108 may reliably determine the voltage drop from these components (using, e.g., 2 mΩ), without having to provide a significant voltage guard band to accommodate voltage variation.

The dynamic current component, on the other hand, may have AC characteristics and, therefore, a varying frequency. Assuming that the frequency of the dynamic current component stays less than 50 MHz, the impedance experienced throughout the range of frequencies may range from approximately 1 to 4 mΩ. Accordingly, for the dynamic current component, the PMU 108 may provide a sufficient voltage guard band to accommodate a voltage variation that corresponds to this 3 mΩ impedance variation. Thus, in accordance with various embodiments, the PMU 108 may determine the distinct voltage variations that correspond to the various current components and set an appropriate voltage V_vid. This determination and setting of V_vid may be done based on changing operating conditions of the processing unit 116, which will, in turn, provide different concentrations of the current components.

The load line 204 is shown as an example. The exact behavior of a load line may be a function of the power delivery design of a particular platform and may change from system to system. The V_vid voltage setting may account for a load line of a specific arrangement.

Figure 4:
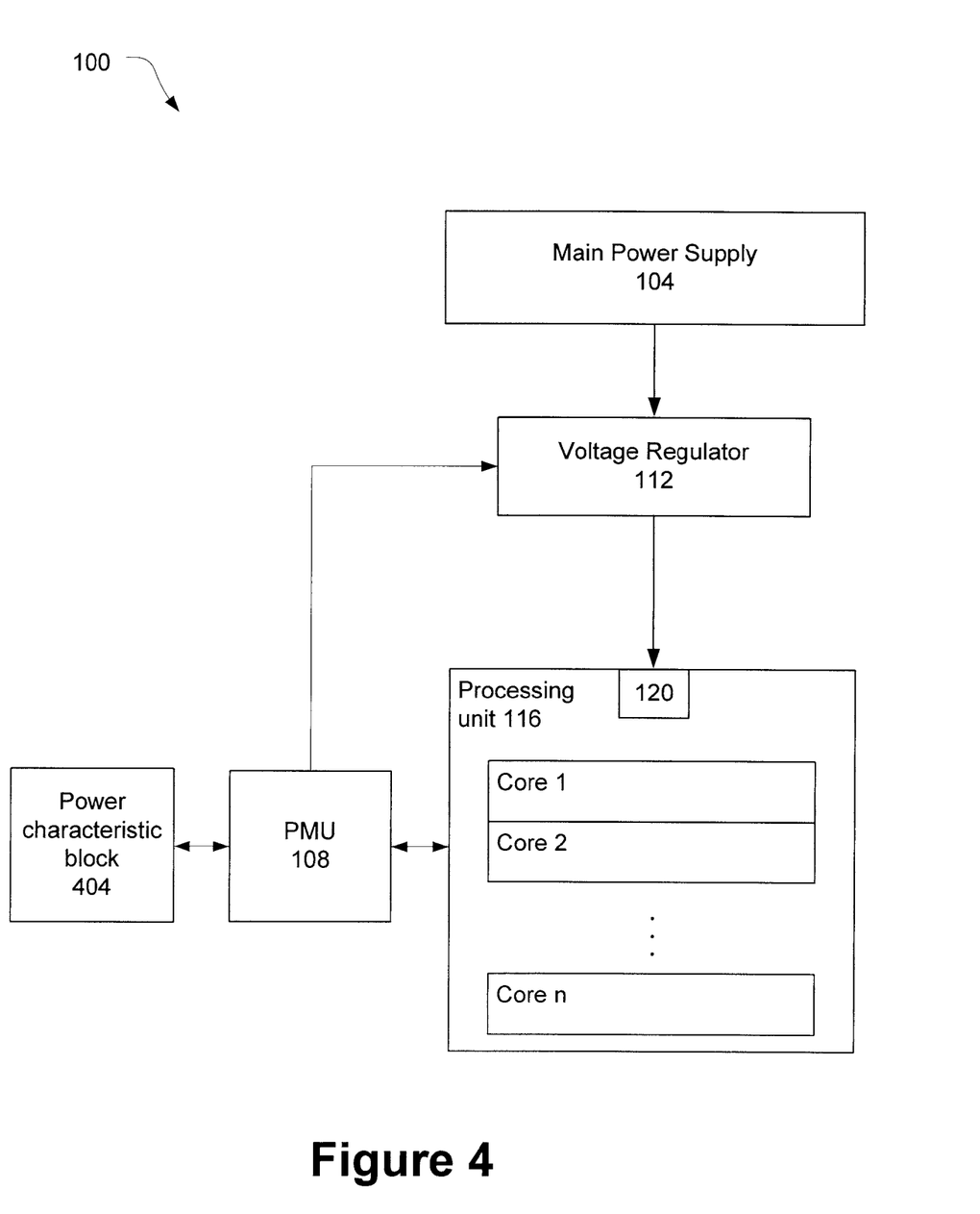
FIG. 4 illustrates the processing and power management system in accordance with various embodiments.

FIG. 4 illustrates the system 100 in which the PMU 108 is coupled with a power characteristic block 404 in accordance with some embodiments. The power characteristic block 404 may include power characteristics of the various current components and/or subsets thereof. The power characteristics may include information that may be used by the PMU 108 to facilitate a determination of the size of at least one subset of the current components, its frequency characteristics, and/or its respective voltage variation based at least in part on operating conditions of the processing unit 116.

For example, power characteristics of a leakage-current subset may provide that the subset changes with a very slow frequency as a response to temperature, while power characteristics of an active-current subset may provide that the subset changes more rapidly as a function of architectural state of the processing unit 108, e.g., activation of cores or functional blocks such as floating point unit, etc. As will be discussed below, these types of power characteristics may be used by the PMU 108 to determine an appropriate response.

As used herein, a subset of the current components may refer to a subset of all of the current components of which the total current is comprised. A subset may include one or more current components, but not all of the current components, of the total current. In some embodiments a subset may exist for each current component. In other embodiments, a subset may include one or more current components with similar power characteristics. For example, in one embodiment a subset may include idle current and leakage current as they may both have DC characteristics as discussed above. In this embodiment, another subset may include the dynamic current.

In various embodiments, the power characteristics may be determined through testing of the system 100. After the system 100 has been tested, the power characteristics may be stored in the power characteristic block 404.

In various embodiments, the power characteristics of a specific load line may be set by the platform designer using a basic input/output system (BIOS) for example.

In various embodiments, the power characteristic block 404 may reside in a non-volatile storage device, firmware, the processing unit 116 itself (e.g., in one or more fuses), etc.

Figure 5:
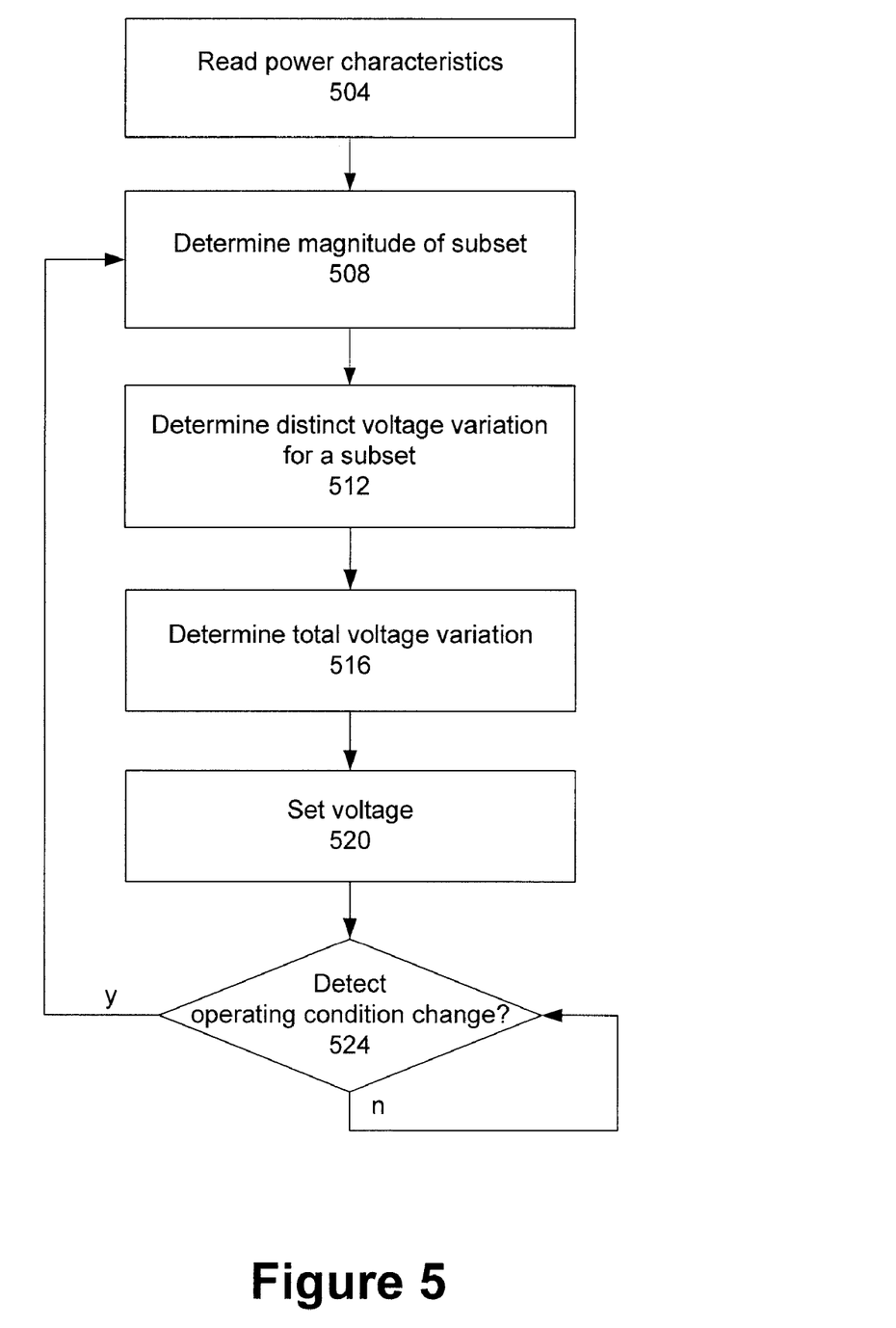
FIG. 5 illustrates a process for determining and setting a voltage in accordance with various embodiments.

FIG. 5 illustrates a process for determining and setting a voltage in accordance with some embodiments. At block 504, the PMU 108 may access the power characteristic block 404 to read the power characteristics for the various subsets of current components.

At block 508, the PMU 108 may determine a magnitude for each of the subsets for a given operating condition of the processing unit 116. An operating condition of the processing unit 116 may include a state of each core of the processing unit 116, the temperature, and the activity of the processing unit 116 (e.g., how many processes, tasks, applications, etc. are being executed by the processing unit 116). The various current components may be functions of the operating conditions of the processing unit 116 as defined by the power characteristics. For example, the leakage current may be a function of voltage V_pu, temperature, and the number of cores that are in a sleep state, e.g., C3, or a more dormant state; idle current may be a function of a number of cores in an operating state, e.g., C0; and dynamic current may be a function of the activity of the processing unit 116.

At block 512, the PMU 108 may determine a distinct voltage variation for a subset of the current components based at least in part on associated power characteristics. A determination of the voltage variation for a subset may be based at least in part on a magnitude of the current components of the subset and a voltage variation impact value associated with the subset. For example, in one embodiment, the PMU 108 may determine a voltage variation for a first subset that includes the idle current component and the leakage current component and a second subset that includes the dynamic current component. The first subset may have DC characteristics and a negligible impact value. Therefore, its resultant voltage variation may also be negligible. The second subset, having the dynamic current component, may have a measurable impact value, which may result in a measurable voltage variation attributed to the dynamic current component.

At block 516, the PMU 108 may determine a total voltage variation for the consumed current. The total voltage variation may be an additive function of voltage variations contributed by each of the subsets of current components. In the example given above, the total voltage variation may be, essentially, the voltage variation attributable to the dynamic current component as the voltage variation attributable to the first subset is negligible.

With the total voltage variation determined, the PMU 108 may set an appropriate voltage V_vid to be admitted to the processing unit 116 by the voltage regulator 112 at block 520.

The PMU 108 may then monitor the processing unit 116 to detect an operating condition change at block 524. If a change is detected, the PMU 108 may loop back to block 508 to begin a redetermination of a voltage to set in light of the changed conditions. If no change is detected, the PMU 108 may continue to monitor operating conditions at block 524.

In various embodiments, a response frequency of the PMU 108 may be limited. For example, the PMU 108 may respond to a change in power characteristics that occur up to 1 kHz, but may be challenged by dynamic changes that occur faster. Responding to faster events may be handled in a variety of ways. In an embodiment for which the changes are known ahead of time, e.g., a C3 exit, the PMU 108 may halt the change until the V_vid change completes, and then allow the change. In other embodiments, architectural events may be monitored as they occur and, once detected, the PMU 108 may halt the condition, change the V_vid and then allow the change to occur. Embodiments in which the architectural events are monitored may be discussed in more detail with respect to FIGS. 6-8.

Figure 6:
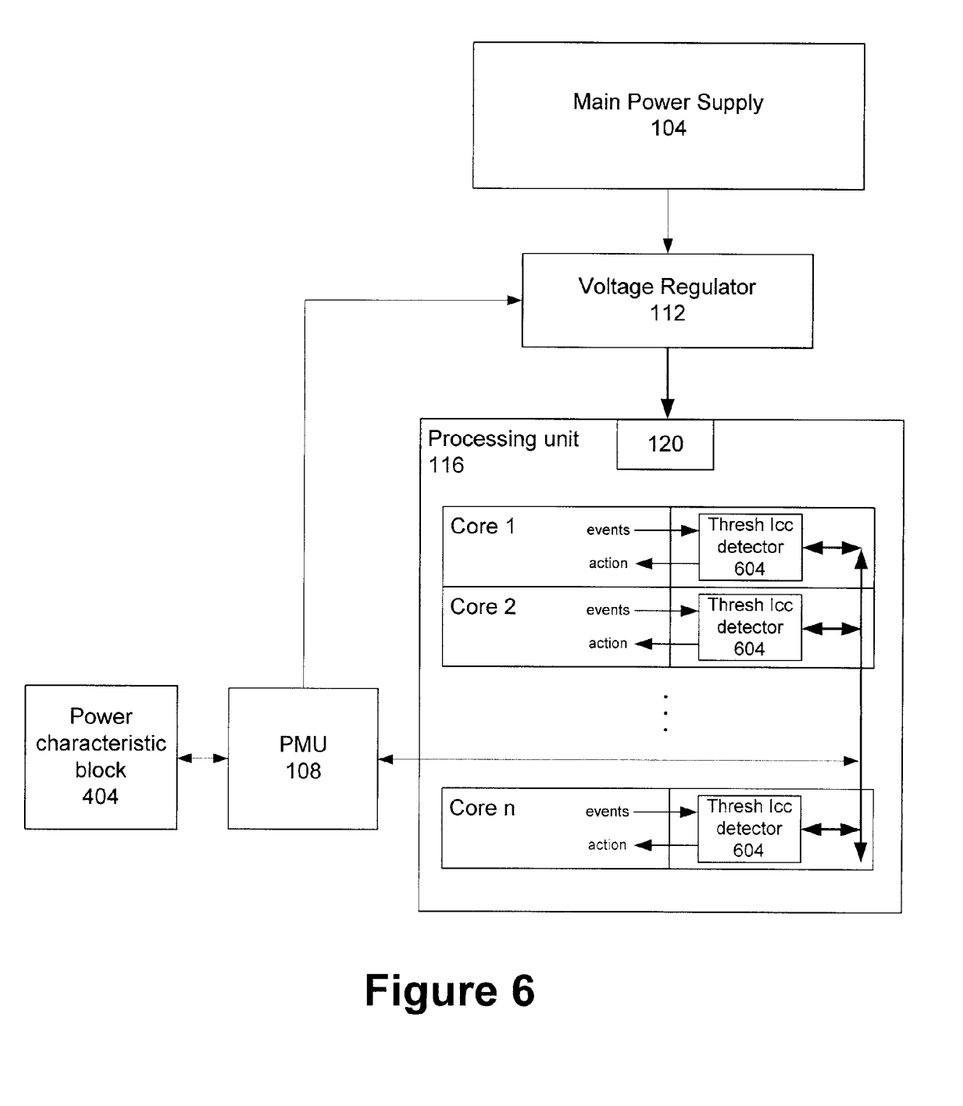
FIG. 6 illustrates the processing and power management system in accordance with various embodiments.

FIG. 6 illustrates the system 100 in accordance with another embodiment. In this embodiment, each of the cores of the processing unit 116 may be configured with a threshold current I_cc detector ("thresh I_cc detector") 604 as shown.

Figure 7:
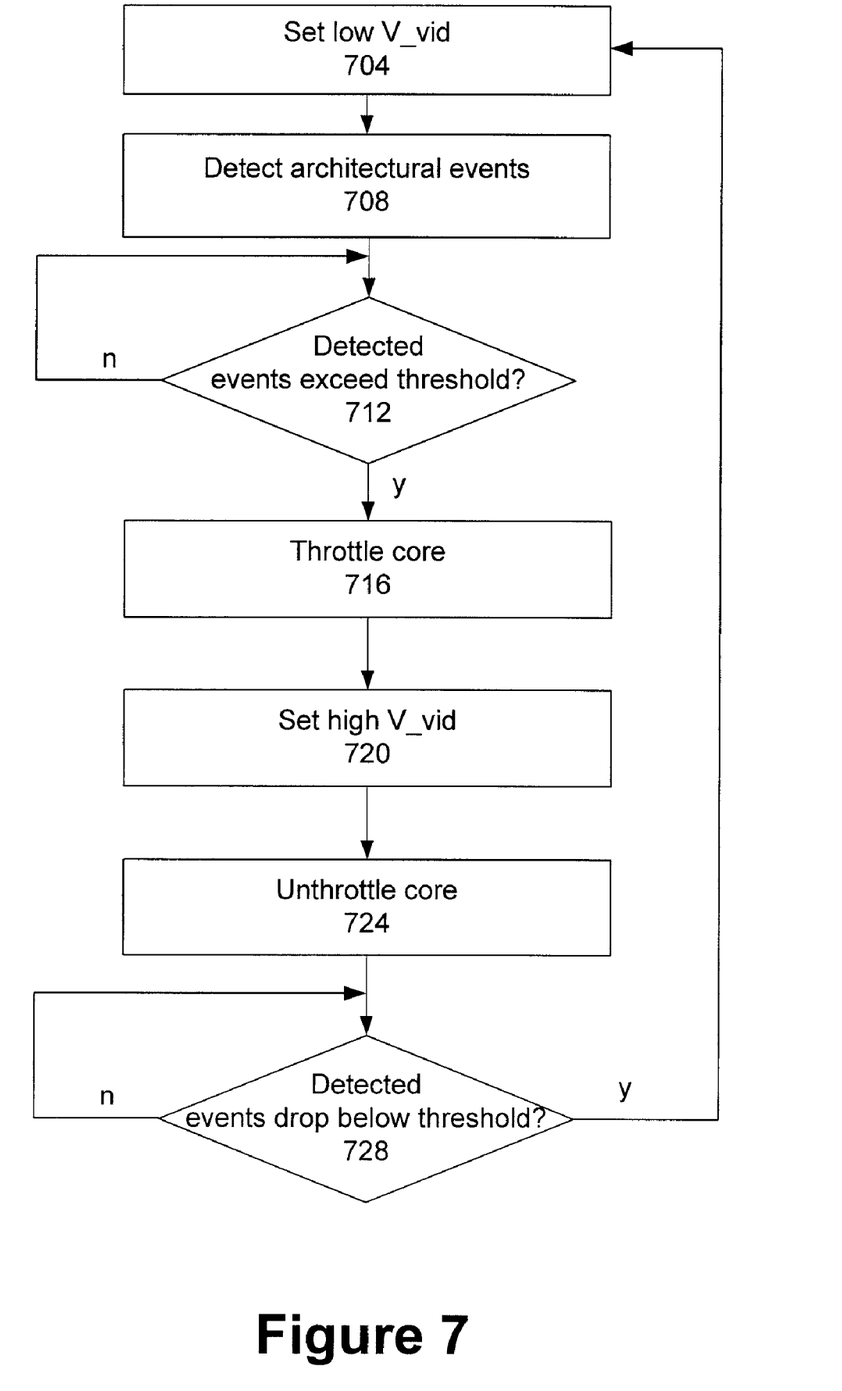
FIG. 7 illustrates a process of operating a processing and power management system in accordance with various embodiments.
Figure 8:
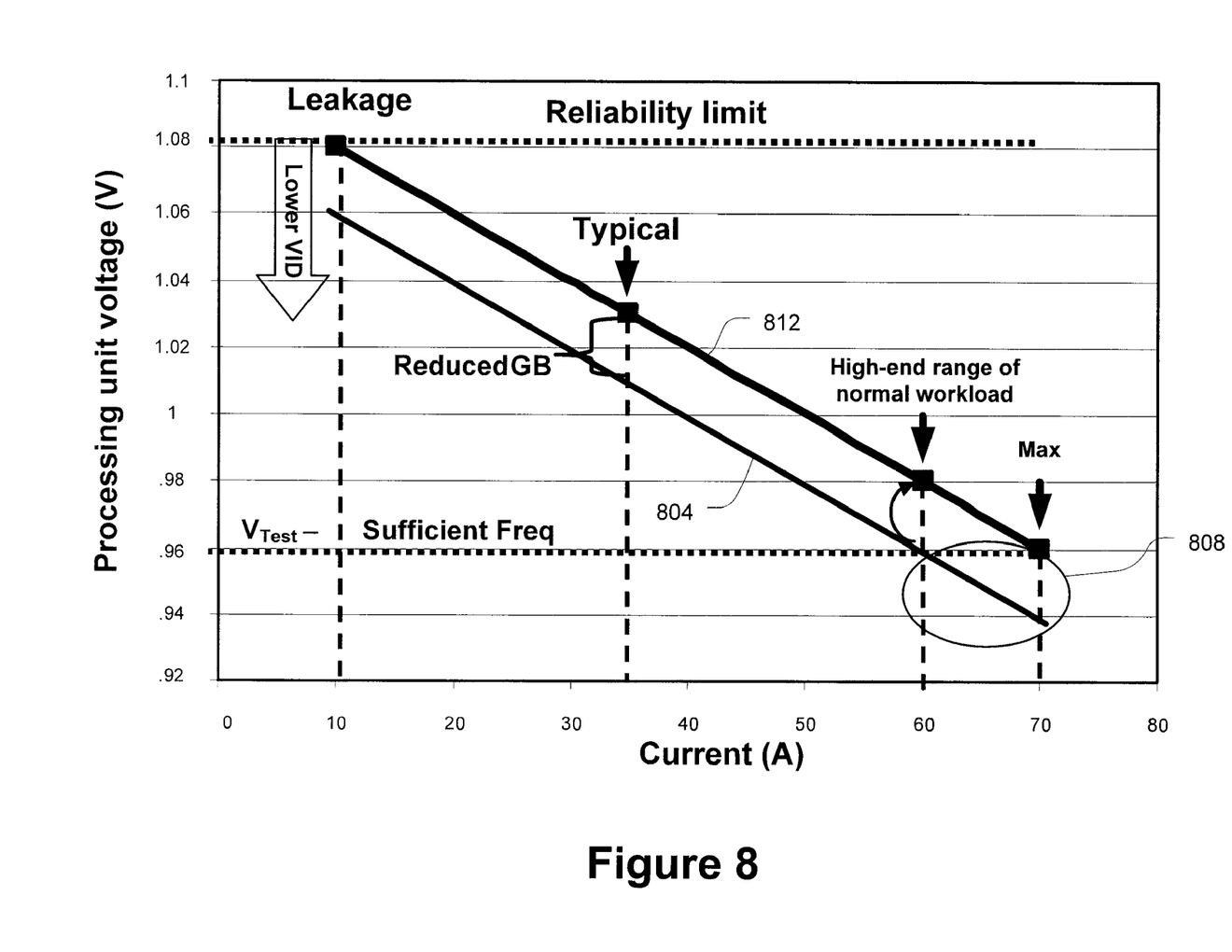
FIG. 8 illustrates load lines as functions of a voltage of a processing unit and current in accordance with various embodiments.

FIG. 7 illustrates a process of operating the system 100 with thresh I_cc detectors 604 in accordance with various embodiments. At block 704, the PMU 108 may set a relatively low voltage V_vid. Referring also to FIG. 8, the low voltage V_vid may be set at approximately 1.08 V (the y-intercept for a load line 804). The low voltage V_vid may be set so that a resulting V_pu is sufficient for a range of current consumed by the processing unit 116 through a normal workload. This range may be defined as a given percentage of total current or as the range in which the processing unit 116 operates for a given percentage of time. In this embodiment, the low voltage V_vid may accommodate currents up to approximately 60 A.

At block 708, the thresh I_cc detectors 604 may detect a variety of architectural events occurring on a particular core. Architectural events may relate to activities on a particular core. For example, an architectural event may be an activation of execution unit, load port activity, etc.

At block 712, a thresh I_cc detector 604 may determine whether the detected architectural events exceed a predetermined threshold, e.g., a predetermined percentage of the execution units operating for a predetermined period of time. Exceeding a predetermined threshold may be indicative of the respective processing core, or the processing unit 116 as a whole, being at risk of drawing a current over a predetermined threshold current. This condition, when viewed as an aggregate of the cores of the processing unit 116, may be reflected by the load line 804 intersecting the voltage floor V_test at 60 A.

By monitoring the architectural events, a thresh I_cc detector 604 may be capable of quickly recognizing that a respective core is readying itself for processing of power-consuming instruction flows.

If the thresh I_cc detector 604 determines that the detected events exceed a threshold at block 712, it may throttle the core to prevent the core from drawing an excessive amount of current at block 716. The thresh I_cc detector 604 may throttle the core by instituting one or more actions that reduce an input rate of instructions, e.g., micro-ops, which the core will execute. This throttling mechanism may provide a suitably fast response to an over-current condition.

In some embodiments, the throttling provided by a thresh I_cc detector 604 may be a first-stage response to an over-current condition. In some of these embodiments, a second-stage response may be provided by the PMU 108 so that the processing unit 116 may operate at a high-end of its current consumption range, shown generally as section 808 of FIG. 8. This may be done by the PMU 108 setting a high voltage V_vid at block 720. Load line 812 of FIG. 8 may correspond to the high voltage V_vid being set at approximately 1.1 V (the y-intercept of the load line 812).

It may be noted that the "high" and "low" descriptors that may be used in conjunction with the voltage V_vid have meaning only in relation to one another. No external or other constraints are intended by use of these terms.

The PMU 108 may initiate the second-stage response, e.g., by setting the high voltage V_vid at block 720, upon a determination that the events threshold has been exceeded at block 712 and/or that the core has been throttled at 716. The thresh I_cc detector 604 may communicate the detection of block 712 and/or the throttling action of block 716 to the PMU 108. In some embodiments, the PMU 108 may make a determination not to initiate the second-stage response. This may occur, e.g., if it is determined that the threshold will most likely be exceeded only for a short time period.

If the PMU 108 does initiate the second-stage response, the thresh I_cc detector 604 that took the throttling action may unthrottle the core, at block 724, once the high voltage V_vid has been set. Unthrottling of the core may be done by ceasing whatever actions were instituted to reduce the input rate of the instructions. The unthrottled core may then operate at full capacity with the higher voltage.

In this manner, the thresh I_cc detector 604 may provide an interim response in the time period that it takes the PMU 108 to ramp up the set voltage. While throttling the core may be associated with reduced operating capabilities, this condition may occur infrequently enough and for a short enough period (until the PMU 108 can adjust the voltage V_vid accordingly) that any performance degradation may go undetected.

If the thresh I_cc detector 604 determines that detected events drop below a threshold at block 728, the PMU 108 may reset the voltage to the low voltage V_id at block 704.

Figure 9:
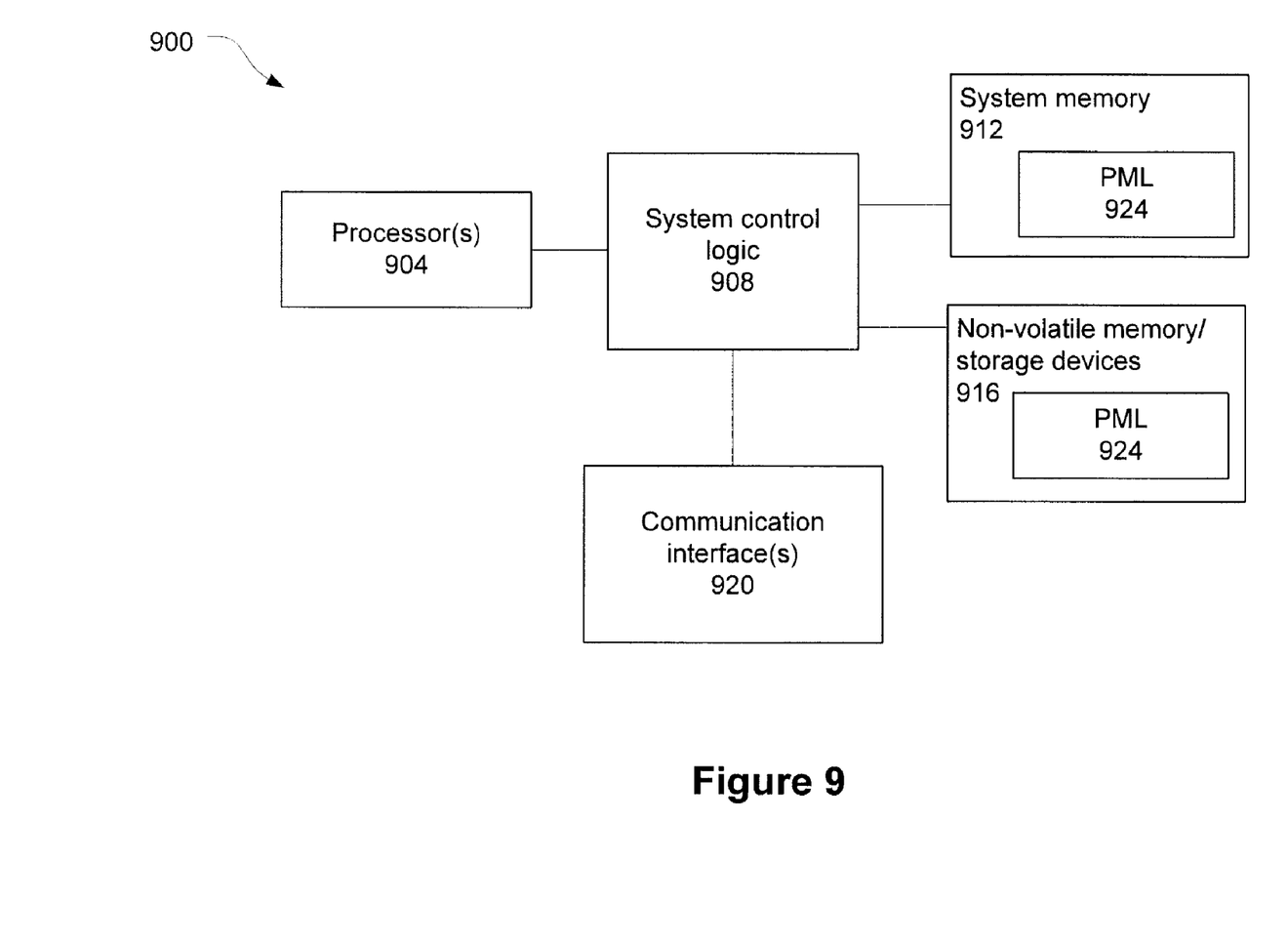
FIG. 9 illustrates a computing device capable of hosting the processing and power management system in accordance with various embodiments.

System 100 may be implemented using any suitable hardware and/or software to configure the system 100 as desired. FIG. 9 illustrates, for one embodiment, an example system 900 comprising one or more processors 904, system control logic 908 coupled to at least one of the one or more processors 904, system memory 912 coupled to system control logic 908, non-volatile memory/storage device(s) 916 coupled to system control logic 908, and one or more communications interfaces 920 coupled to system control logic 908.

System control logic 908 for one embodiment may include any suitable interface controllers to provide for any suitable interface to at least one of the one or more processors 904 and/or to any suitable device or component in communication with system control logic 908.

System control logic 908 for one embodiment may include one or more memory controllers to provide an interface to system memory 912. System memory 912 may be used to load and store data and/or instructions, for example, for system 900. System memory 912 for one embodiment may include any suitable volatile memory, such as suitable dynamic random access memory (DRAM) for example.

System control logic 908 for one embodiment may include one or more input/output (I/O) controllers to provide an interface non-volatile memory/storage device(s) 916, and communications interface(s) 920.

Non-volatile memory/storage device(s) 916 may be used to store data and/or instructions, for example. Non-volatile memory/storage device(s) 916 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

The non-volatile memory/storage device(s) 916 may include a storage resource physically part of a device on which the system 900 is installed or it may be accessible by, but not necessarily a part of, the device. For example, the non-volatile memory/storage devices 916 may be accessed over a network via the communication interface(s) 920.

System memory 912 and non-volatile memory/storage devices 916 may include in particular, temporal and persistent copies of power management logic 924, respectively. The power management logic 924 may include instructions that when executed by the processing unit 904 result in the system 900 performing power management operations described in conjunction with the PMU 108 described herein. In some embodiments, the power management logic 924 may additionally/alternatively be located in the system control logic 908.

Communications interface(s) 920 may provide an interface for system 900 to communicate over one or more networks and/or with any other suitable device. Communications interface(s) 920 may include any suitable hardware and/or firmware. Communications interface(s) 920 for one embodiment may include, for example, a network adapter, a wireless network adapter, a telephone modem, and/or a wireless modem. For wireless communications, communications interface(s) 920 for one embodiment may use one or more antennas.

For one embodiment, at least one of the one or more processor(s) 904 may be packaged together with logic for one or more controllers of system control logic 908. For one embodiment, at least one processor of the one or more processor(s) 904 may be packaged together with logic for one or more controllers of system control logic 908 to form a System in Package (SiP). For one embodiment, at least one processor of the one or more processor(s) 904 may be integrated on the same die with logic for one or more controllers of system control logic 908. For one embodiment, at least one processor of the one or more processors 904 may be integrated on the same die with logic for one or more controllers of system control logic 908 to form a System on Chip (SoC).

In various embodiments, computing device 900 may have more or less components, and/or different architectures.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus comprising:
   a processing unit;
   a power characteristic block having a predetermined power characteristic associated with a subset of current components of a current consumed by the processing unit, the power characteristic corresponding to a frequency response of the subset with respect to an operating condition of the processing unit; and
   a power management unit coupled to, or integrated within, the processing unit and further coupled to the power characteristic block, the power management unit configured to:
   receive, from the power characteristic block, the power characteristic;
   determine, based on the power characteristic and the operating condition, a voltage variation that corresponds to the subset of current components of the current consumed by the processing unit, the operating condition including a temperature of one or more cores of the processing unit, state of the one or more cores of the processing unit, number of processes being executed by the processing unit, number of tasks being executed by the processing unit, and/or number of applications that are being executed by the processing unit; and
   control a voltage regulator based at least in part on the determined voltage variation.

2. The apparatus of claim 1, wherein the subset of current components has direct current characteristics and the power management unit is further configured to determine another voltage variation that corresponds to another subset of current components, the another subset of current components having alternating current characteristics.

3. The apparatus of claim 1, wherein the subset includes one or more current components and the power management unit is further configured to determine the voltage variation based at least in part on a magnitude of the one or more current components and an impact value associated with the subset.

4. The apparatus of claim 1, wherein the power management unit is further configured to determine a plurality of voltage variations that respectively correspond to a plurality of subsets of current components of the current.

5. The apparatus of claim 4, wherein the subset is a first subset of the plurality of subsets and is associated with a first impact value and a second subset of the plurality of subsets is associated with a second impact value that is different from the first impact value.

6. The apparatus of claim 5, wherein the first subset includes idle current and leakage current and the second subset includes dynamic current.

7. The apparatus of claim 4, wherein the power management unit is further configured to determine a magnitude for at least a first and a second subset of the plurality of subsets based at least in part on the determined operating condition.

8. The apparatus of claim 1, wherein the power management unit is configured to control the voltage regulator to provide a voltage guard-band based at least in part on the determined voltage variation.

9. The apparatus of claim 1, wherein the power management unit is configured to provide a digital voltage identification value to the voltage regulator to control the voltage regulator.

10. The apparatus of claim 1, wherein the power management unit is further configured to:
   determine a voltage variation that corresponds to each subset of current components of a plurality of subsets of current components of the current consumed by the processing unit;
   determine a total voltage variation as an additive function of the determined voltage variations corresponding to the plurality of subsets of current components; and
   control the voltage regulator based at least in part on the determined total voltage variation.

11. A non-transitory machine-accessible medium having associated instructions that, when executed, result in the machine:
   reading power characteristics of a subset of current components of a current consumed by a processing unit;
   determining a magnitude for the subset based at least in part on the power characteristics based on an operating condition of the processing unit;
   determining a voltage variation that corresponds to the subset based at least in part on the magnitude of the subset and the power characteristics; and
   setting a voltage based at least in part on the determined voltage variation;
   wherein the operating condition of the processing unit includes temperature of one or more cores of the processing unit, state of the one or more cores of the processing unit, number of processes being executed by the processing unit, number of tasks being executed by the processing unit, and/or number of applications that are being executed by the processing unit.

12. The non-transitory machine-accessible medium of claim 11, wherein said instructions, when executed, further result in the machine:
   determining another voltage variation that corresponds to another subset of current components of the current; and
   setting the voltage based at least further in part on the another voltage variation.

* * * * *